May 2, 1933.  T. L. LYNCH  1,906,696
PIPE TONGS
Filed March 16, 1931  2 Sheets-Sheet 2
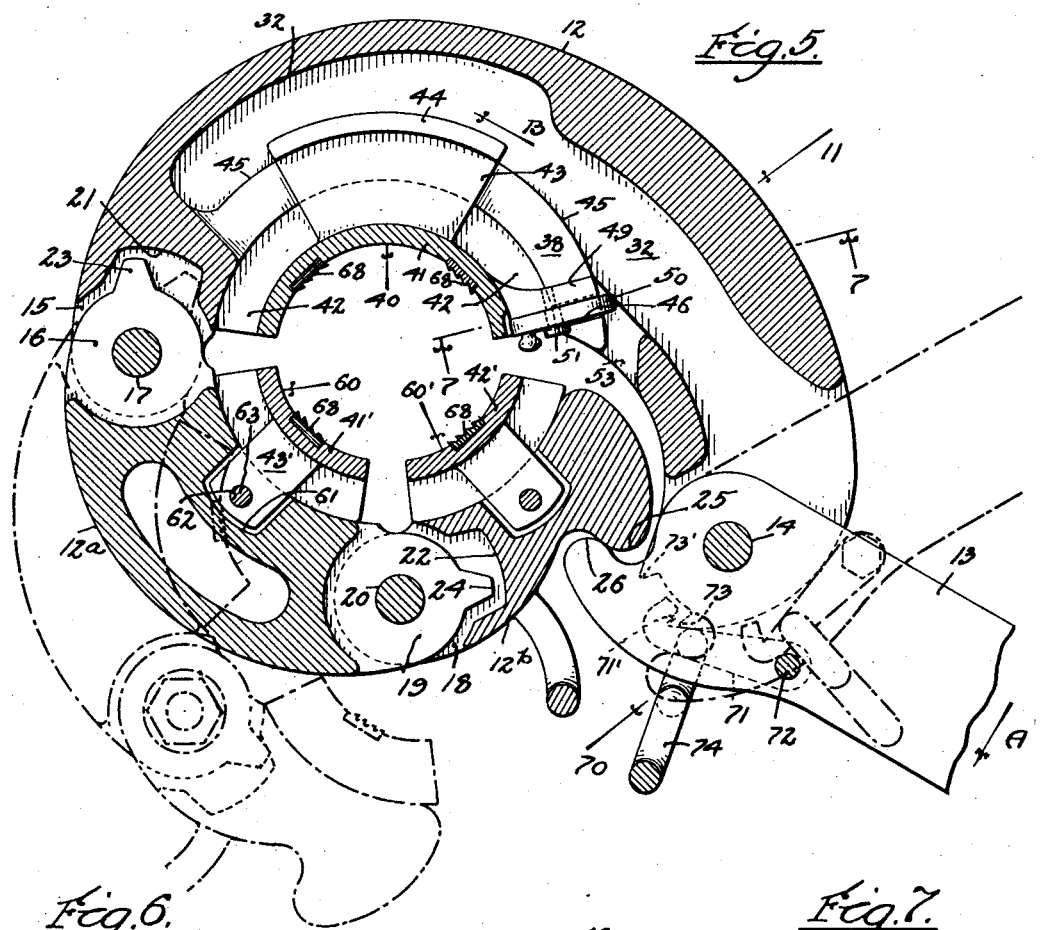
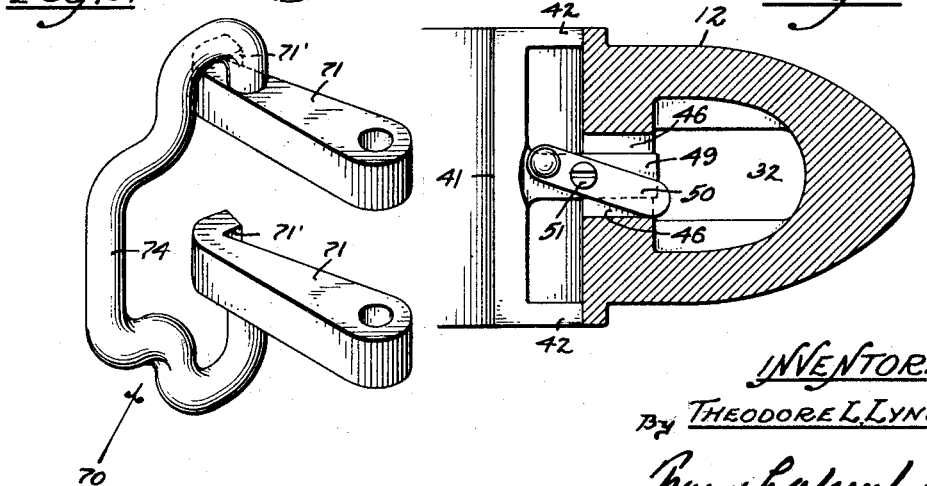
INVENTOR:
By THEODORE L. LYNCH,
ATTORNEY.

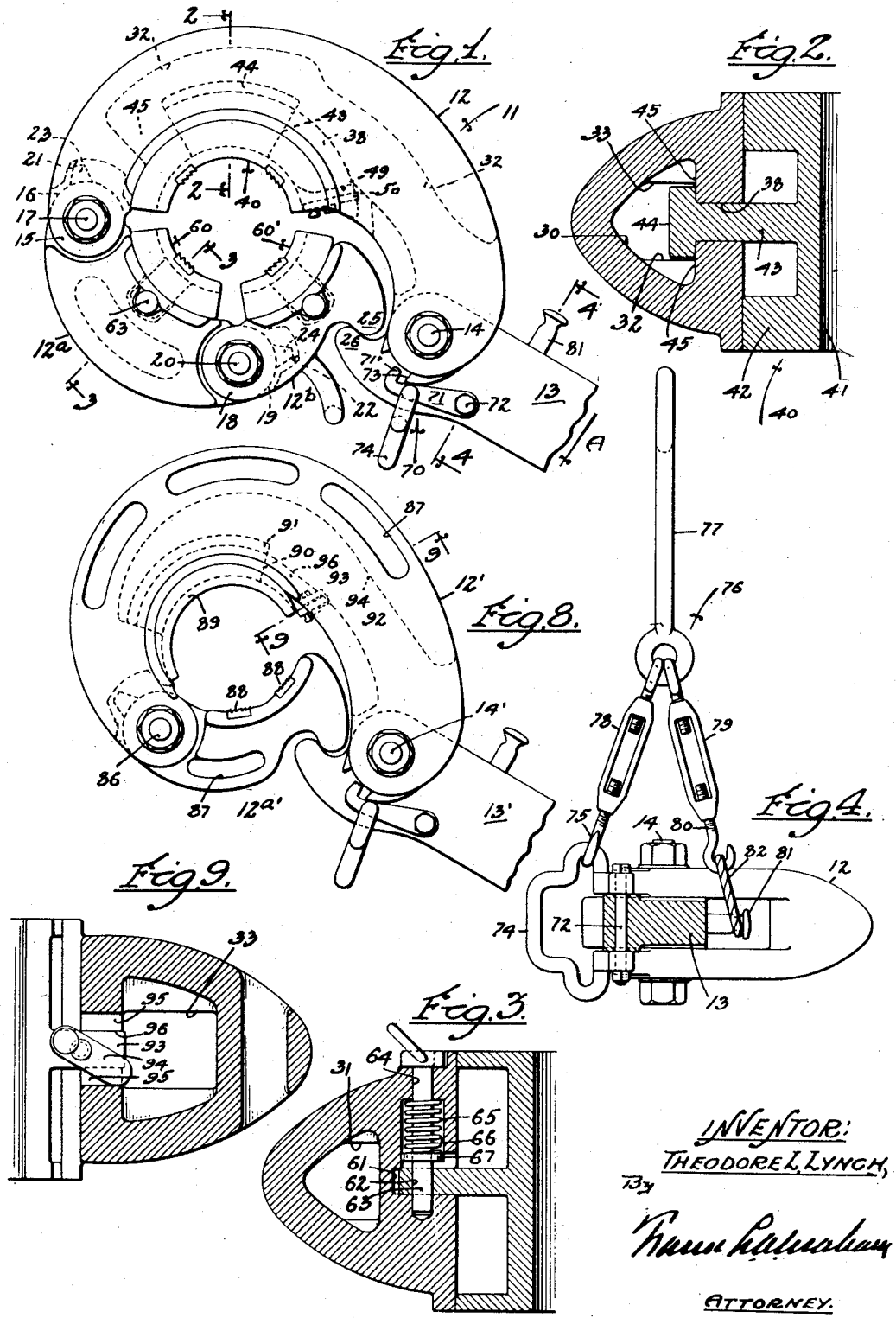

Patented May 2, 1933

1,906,696

UNITED STATES PATENT OFFICE

THEODORE L. LYNCH, OF SOUTHGATE, CALIFORNIA

PIPE TONGS

Application filed March 16, 1931. Serial No. 523,012.

This invention has to do in a general way with wrenches or tongs of the type ordinarily used in handling drill pipe and casing, and is more particularly related to improvements in such tongs whereby a single tong unit is adaptable for use on different sizes of pipe or casing.

It is well known to those familiar with the art that the usual construction followed in tongs of this nature comprises a plurality of pipe gripping members which are hinged together and are attached to a handle. The gripping members are provided with a latch whereby they may be held in encircling relation to a pipe. Tongs of the type ordinarily used in handling drill pipe and casing such as is used in oil well drilling practice, are generally suspended in some manner from a member in the derrick so that the only manual operation necessary in bringing the tongs into pipe engaging relation is to swing them on the suspending member and, of course, operate the jaws or gripping members. It has been common practice to employ a single tong unit for each size of casing or drill pipe, and it is the primary object of this invention to produce a pair of tongs which are constructed so that they may receive bushings of various sizes to adapt them for use on different sizes of pipe.

The invention is more specifically directed to a novel form of support or mounting for the bushings and it is a noteworthy feature of the invention that the bushings may be quickly removed and replaced by bushings of another size.

Another noteworthy feature of this invention resides in the novel form of latch used in locking the bushings in place, such latch being gravity operated and more or less automatic in its operation and being constructed so that the bushings are held in place with either face of the tongs uppermost.

It is still a further object of this invention to produce a novel form of lock or latch mechanism adapted for use in connection with tongs of this nature whereby the weight of the tongs is utilized in maintaining the latch finger toward a closed position, thus eliminating any springs and avoiding the damage which occurs in the event such a spring breaks while the tongs are in operation. The latch contemplated by this invention has the added feature of preventing "jack knifing" of the tongs when they are removed from a pipe.

A further object of this invention is to produce stop means associated with the various segments or gripping members comprising the pipe encircling unit for limiting the outward movement of these members relative to each other.

The details in the construction of a preferred form of my invention, together with other objects attending its production, will be best understood from the following description of the accompanying drawings which are chosen for illustrative purposes only, and in which—

Fig. 1 is a plan view of a pair of tongs embodying my invention;

Fig. 2 is an enlarged sectional view taken in a plane represented by the line 2—2 in Fig. 1;

Fig. 3 is an enlarged sectional view taken in a plane represented by the line 3—3 in Fig. 1;

Fig. 4 is a sectional elevation taken in a plane represented by the line 4—4 in Fig. 1 and illustrates the construction of the tong latch contemplated by this invention;

Fig. 5 is a plan section partly an outside view showing the tongs open and illustrating the manner of removing and inserting the bushings;

Fig. 6 is an enlarged perspective view illustrating the details in the construction of the latch finger;

Fig. 7 is a sectional elevation taken in a plane represented by the line 7—7 in Fig. 5 and illustrates the construction of the bushing latch;

Fig. 8 is a plan view similar to Fig. 1 but shows a modified form of my invention;

Fig. 9 is an enlarged section taken in a plane represented by the line 9—9 in Fig. 8.

More particularly describing the invention as herein illustrated, reference numeral 11 indicates a pipe gripping unit which is comprised of segmental gripping members 12, 12a and 12b, and is pivotally attached through the gripping member 12 to a handle 13 by means of a bolt or pin 14. In this form of my invention the end portion of the gripping member 12 is provided with cheeks which extend over the end of the handle 13, the cheeks and the end portion of the handle being provided with openings for receiving the bolt or pin 14.

The gripping member 12 is hinged to the gripping member 12a by a hinge connection consisting of cheeks 15 on the member 12 and a projection 16 on the member 12a, the cheeks and the projection being provided with apertures for receiving a bolt or pin 17. Similarly the gripping member 12a is hinged to the gripping member 12b through a connection consisting of cheeks 18 on the member 12b and a projection 19 on the member 12a which are apertured for the reception of a pin or bolt 20.

For the purpose of limiting the movement of the member 12a relative to the member 12, and the member 12b relative to the member 12a, I provide the ends of the members 12 and 12b respectively with recesses 21 and 22 and the member 12a has its opposite ends provided with projections 23 and 24 which extend into the recesses 21 and 22 and serve to limit the relative movement of the segmental gripping members. It will be noted that the free end of the pipe gripping unit 11 which is the end of the gripping member 12b, is provided with a cam nose 25 and that the inner end portion of the handle 13 is similarly provided with a cam nose 26 which is situated so as to be swung into engagement with the cam nose 25 when the pipe gripping members are in pipe encircling position, and from this construction it will be seen that when the handle 13 is swung in the direction of the arrow A, the cam nose 26 presses the cam nose 25 inwardly and consequently forces the gripping members into pressure engagement with a pipe which is enclosed by the pipe gripping unit.

From the sectional views shown in Figs. 2, 3, and 7, it will be noted that the gripping members are provided with hollow passages indicated by reference numerals 30 and 31. These passages serve the purpose of providing a thick section which is comparatively light in weight and to increase the strength of the members the passages are shown as being provided with ribs 33 and 33'.

The passage 32 in the member 12 has the additional purpose of cooperating with a slot 38 in this member to form a means of securing a reducing bushing to the gripping member 12. The bushing is indicated by reference numeral 40 and is shown as comprising a pipe engaging portion 41 which has flanges 42 formed on its edges and is provided with a tongue 43 which is adapted to slide through the slot 38. The inner edge of the tongue 43 is provided with a head or flange 44 which extends into the passage 32 and engages the shoulders 45 formed therein. This last mentioned construction prevents the radial movement of the bushing 40 relative to the gripping member 12.

For the purpose of preventing the sliding movement of the bushing in the gripping member after the bushing has been installed, I provide the gripping member 12 with a pair of notches 46 which are situated in the slot 38 near the end portion of the bushing 40. The bushing 40 has provided on its outer surface a projection 49 to which a finger 50 is pivotally attached by means of the pivot pin 51. This finger 50 is adapted to drop into either of the notches 46, depending upon the position of the tongs, and it will be noted that this finger provides a means for locking the bushing in place irrespective of the position of the tongs. In inserting the bushing 40 the tongue 43 is placed opposite the opening 53 at the end of the slot 38 and the bushing is rotated in the direction of the arrow B until it occupies the position shown in Fig. 1. The latch finger 50 is then permitted to drop into the slot 46 and the bushing is locked in place.

Reference numerals 60 and 60' indicate bushing members of a slightly different type which are attached to the gripping members 12a and 12b. These bushing members are similar to the member shown in Figs. 2 and 7 in that they comprise an inner pipe engaging member 41' and side flanges 42'. The tongue 43' is, however, different from the tongue 43 in that it is more narrow in construction and its inner end is adapted to move radially into a recess 61 formed on the inner surface of the gripping member 12a or 12b. The inner end portion of the tongue which is received in the recess is provided with an aperture 62 which is adapted to receive a pin 63. The pin is slidably mounted in a suitable passage 64 formed in the gripping member and is yieldably pressed downwardly toward the aperture in the tongue by means of a coil spring 65 which is contained within a chamber 66 and is interposed between a flange 67 formed on the pin and the upper surface in the chamber.

It will be noted that both forms of bushings which were described above are provided at their intermediate portions with tongues which are adapted for reception in recesses formed in the gripping members and situated in planes which are between the top and bottom faces of the gripping member. Reference numerals 68 indicate dies which are positioned in the bushing members for engaging the pipe.

Reference numeral 70 indicates a latching member which comprises a pair of fingers 71 pivotally attached to the handle 13 by means of a bolt or pin 72 and having notches 71' formed on their inner ends which are adapted to pass over engaging shoulders or bosses 73 formed on the pivoted end of the gripping member 12. These fingers are shown as being rigidly connected together by means of a lock, link or loop 74 which is adapted to receive a hook 75 of the tong suspending member 76, and is provided with an enlarged mid-portion which serves as a handle for operating the latch. This suspending member comprises a bar 77, a pair of turnbuckles 78 and 79 which have their upper ends attached to the bar 77. The lower end of the turnbuckle 78 receives the hook 75 and the lower end of turnbuckle 79 receives a hook 80 which is attached to a finger 81 rigidly mounted on the handle 13 through the medium of a link or cable 82. From this construction it will be seen that the latching member 70 is continuously maintained toward a latching position due to the weight of the tongs in connection with the suspending member 76. This last described construction obviates the use of springs in connection with the tong latch and eliminates the danger which would be present in the event such a spring would break during the operation of the tongs. For the purpose of preventing the "jack knifing" of the gripping member when the tongs are removed from the pipe, I provide a second stop or boss 73' on the member 12. This stop is situated in spaced relation with the stop 73 and is adapted to be engaged by the finger 71 when the jaws or gripping members swing in a "closing" direction.

In Figs. 8 and 9 I show a modified form of my invention which is more particularly adapted for use on small sizes of the pipe. This member comprises only two pipe gripping units indicated by reference numerals 12' and 12a'. These two members are hinged together in the same manner as the individual gripping segments shown in Fig. 1, the hinge connection being indicated by reference numeral 86. The edges of the gripping members 12' and 12a' are shown as being provided with hand holds 87 and the end of the member 12' is pivotally attached to the handle 13' by means of the pivot pin 14'. In this particular unit the gripping member 12a' is not adapted for receiving a bushing, but is provided with permanently located dies which are indicated by reference numeral 88. The gripping member 12' is adapted to receive a bushing member 89 which is similar to the bushing 40 described in connection with Fig. 1. This bushing member is provided with a tongue 90 having a flange 91 on its inner end adapted for sliding reception in the passage 92 formed in the interior of the gripping member and the bushing is adapted to be locked in place by means of a latch consisting of a projection 93 to which a finger 94 is pivotally attached, the finger being adapted for reception in notches 95 formed in the edges of the slot 96 which receives the tongue 90.

It will be apparent from the foregoing description that the device contemplated by this invention is of simple form and construction, it may be easily and economically manufactured, and the bushing members may be quickly removed and replaced for accommodating the tong for use in connection with various sizes of pipe or tubing.

It will be understood that while I have shown the tongs comprised of two and three gripping units, any number of such units may be employed, and it is to be further understood that while I have herein described and illustrated two preferred forms of my invention, the invention is not limited to the precise construction described above, but includes within its scope whatever changes fairly come within the spirit of the appended claims.

I claim as my invention:

1. Pipe tongs embodying: a plurality of gripping members hinged together; a handle attached to one of said members; means for latching said members in closed relation about a pipe, one of said members being provided with a curved passage and a slot connecting said passage with the inner surface of said member; a shoe adapted to fit on the inner surface of the slotted member; a tongue on said shoe extending into said slot; and means for securing said tongue against movement in said slot.

2. Pipe tongs embodying: a plurality of gripping members hinged together; a handle attached to one of said members; means for latching said members in closed relation about a pipe, one of said members being provided with a curved passage and a slot connecting said passage with the inner surface of said member; a shoe adapted to fit on the inner surface of the slotted member; a tongue on said shoe extending into said slot; a flange on the end of said tongue for holding said bushing against radial movement; and a bushing latch for holding said bushing against rotary movement.

3. Pipe tongs embodying: a plurality of gripping members hinged together; a handle attached to one of said members; means for latching said members in closed relation about a pipe, one of said members being provided with a curved passage and a slot connecting said passage with the inner surface of said member; a shoe adapted to fit on the inner surface of the slotted member; a tongue on said shoe extending into said slot; a flange on the end of said tongue for holding said bushing against radial movement; and a bushing latch for holding said bushing against rotary movement, said bushing latch comprising a finger pivotally attached to said bushing and adapted for reception in notches in said gripping member.

4. Pipe tongs embodying: a plurality of gripping members hinged together; a handle attached to one of said members; means for latching said members in closed relation about a pipe, one of said members being provided with a curved passage and a slot connecting said passage with the inner surface of said member; a shoe adapted to fit on the inner surface of the slotted member; a tongue on said shoe extending into said slot, the slot in said gripping member being provided with notches situated at the end of said bushing; and a finger pivotally mounted on said bushing and adapted to be received in one of said notches for locking said bushing against radial movement in said gripping member.

5. Pipe tongs embodying: a handle; a plurality of gripping members hinged together to form a pipe encircling unit having one end pivotally attached to said handle; a cam nose on said handle; another cam nose on the free end of said unit adapted to be engaged by the nose on said handle; a shoulder on the end of said unit which is pivoted to said handle; and a finger pivotally mounted on said handle and engaging with said shoulder for holding said handle against movement to a position at which said cam noses will be disengaged.

6. Pipe tongs embodying: a handle; a plurality of gripping members hinged together to form a pipe encircling unit having one end pivotally attached to said handle; a cam nose on said handle; another cam nose on the free end of said unit adapted to be engaged by the nose on said handle; a shoulder on the end of said unit which is pivoted to said handle; a finger pivotally mounted on said handle for engagement with said shoulder; and a tong suspending member comprising two links one of which is attached to said finger for maintaining said finger in engagement with the free end of said unit and the other of which is secured to said handle on the side opposite said finger.

7. Pipe tongs embodying: a handle; a pipe gripping member having one end pivotally attached to said handle and having its free end provided with a cam nose; a cam nose on said handle adapted to engage the nose on said gripping member for holding said gripping member in a pipe engaging position; and latch means for limiting the movement of said handle relative to said gripping member comprising a finger pivotally attached to said handle, shoulders on said gripping member adapted to be engaged by said finger and a tong suspending member comprising two links one of which is attached to said finger so as to maintain said finger in engagement with said gripping member and the other of which is secured to said handle on the side opposite said finger.

8. Pipe tongs embodying: a handle; a plurality of gripping members hinged together to form a pipe encircling unit having one end pivotally attached to said handle; a cam nose on said handle; another cam nose on the free end of said unit adapted to be engaged by the nose on said handle; a pair of oppositely disposed shoulders on the end of said unit pivoted to said handle; a finger pivotally attached to said handle and having a hook adapted for reception in the space between said shoulders; and means for drawing the hook on said finger into the space between said shoulders, such means comprising an open A suspension unit having one leg attached to said finger and having the other leg secured to the handle on the side opposite said finger.

In testimony whereof, I have hereunto set my hand at Los Angeles, California, this 17th day of February, 1931.

THEODORE L. LYNCH.